United States Patent [19]

Spurr

[11] 3,845,259
[45] Oct. 29, 1974

[54] FLOW CONTROLLED SWITCH, OPERATED BY A PIVOTAL SHAFT

[75] Inventor: Robert Spurr, West Hartford, Conn.

[73] Assignee: Notifier Company, Lincoln, Nebr.

[22] Filed: May 11, 1973

[21] Appl. No.: 360,405

[52] U.S. Cl. .............................. 200/81.9 R, 73/228
[51] Int. Cl. ............................................ H01h 35/40
[58] Field of Search ................. 200/81.9 R; 73/228

[56] References Cited
UNITED STATES PATENTS

| 2,583,814 | 1/1952 | Burklin | 200/81.9 R |
| 3,119,979 | 1/1964 | Martin | 200/81.9 R |
| 3,501,605 | 3/1970 | Hutchinson | 200/81.9 R |

FOREIGN PATENTS OR APPLICATIONS

| 1,276,252 | 8/1968 | Germany | 200/81.9 R |
| 1,188,746 | 3/1965 | Germany | 200/81.9 R |

Primary Examiner—Robert K. Schaefer
Assistant Examiner—Gerald P. Tolin
Attorney, Agent, or Firm—Lowe, Kokjer, Kircher, et al.

[57] ABSTRACT

Movable flow-detecting means in a fluid carrying conduit extends into a housing secured to the outside of the conduit, and a pivotal shaft connected to the flow detecting means extends through an opening in the housing to contact and actuate an external switch when pivoted by the force of fluid flow in the conduit. An arm secured to the shaft has elongated knife edge projections aligned on opposite sides of the shaft in a direction transverse to fluid flow in the conduit. The knife edges are received in corresponding trough grooves in a resilient member that seals the opening in the housing and pivotally supports the shaft. The knife edges are in line contact on a rigid backup element fastened to the housing to provide a frictionless pivot for the shaft. The arms are in hydrostatic balance within the housing to minimize friction-producing forces on the knife edge pivot.

11 Claims, 4 Drawing Figures

FLOW CONTROLLED SWITCH, OPERATED BY A PIVOTAL SHAFT

BACKGROUND AND BRIEF DESCRIPTION OF THE INVENTION

This invention relates to flow responsive switch mechanisms for sensing flow in a fluid carrying conduit and actuating an externally located switch.

Flow responsive switch mechanisms of the type referred to have many varied applications for sensing and controlling flow in fluid carrying apparatus as well as operating associated structure in response to the presence or absence of fluid flow. Many such switches now available sense fluid flow by movement of a vane or like detector disposed in a fluid carrying conduit. Physical movement of the detector is accomplished either directly by fluid flow impinging thereon or by use of structure such as orifices, blades or turbines in the conduit that creates a pressure differential which causes shifting of the detector. This physical movement must then be transmitted externally of the conduit to operate a switch, usually electrical, to indicate the presence of flow.

A serious problem with such mechanism relates to the ability of transmitting physical motion exteriorly of the conduit while still maintaining an effective fluid seal. The most successful technique for combating this problem utilizes a shaft which pivots in response to movement of the flow detecting means. The shaft is bonded to an elastomeric member that seals the conduit, and extends through the seal to a position for engaging and operating the external switch. A drawback to this arrangement, however, is the relatively high frictional forces resisting pivoting motion of the shaft that are imposed to hold the shaft in position and to maintain an effective seal around it. Heretofore, attempts to minimize these frictional forces have met with limited success as the shaft would move without control in response to surges and fluctuations in flow volume and velocity, and become disoriented relative to the external switch and/or direction of fluid flow, thereby resulting in erroneous indications or readouts of flow. At the same time, however, the high frictional forces themselves create erroneous readouts because of large variations in the frictional forces due to changes in environmental conditions and aging of the seal.

It is the primary object of the present invention to provide a fluid flow detecting switch mechanism of the type referred utilizing a pivotal shaft for transferring physical motion through a seal to the exterior of the conduit, wherein the shaft pivots essentially free of friction to operate an external switch, and yet the shaft is constrained against torsional, axial and like movements that may cause disorientation of the shaft.

A more particular object of the invention is to provide an essentially frictionless pivot for the shaft in the form of a pair of projections secured to the shaft and having elongated knife edges aligned transverse to the direction of fluid flow which lie in line contact against a rigid element disposed behind the seal member to hold the latter in place against hydraulic forces developed in the conduit. The knife edge pivots friction free on the backup element to allow a pivoting or rocking motion of the shaft sufficient to actuate the external switch.

A corollary to the preceding object is to provide elongated trough grooves in the seal member which receive the projections in closely fitting relationship to provide the line contact between the knife edges and the backup element while effectively sealing the conduit. The projections cooperate with the closely fitting seal member to help constrain the shaft against undesired motion without interfering with the switch-actuating motion of the shaft.

Another very important object is to provide a switch mechanism as set forth in the preceding objects which is configured to minimize friction-producing hydrostatic forces that are imposed on the shaft.

These and other objects of the invention, together with the features of novelty appurtenant thereto, will appear in the course of the following description.

DETAILED DESCRIPTION OF THE INVENTION

In the accompanying drawings which form a part of this application and are to be read in conjunction therewith, and in which like reference numerals are employed to indicate like parts in various views.

Figure 1:
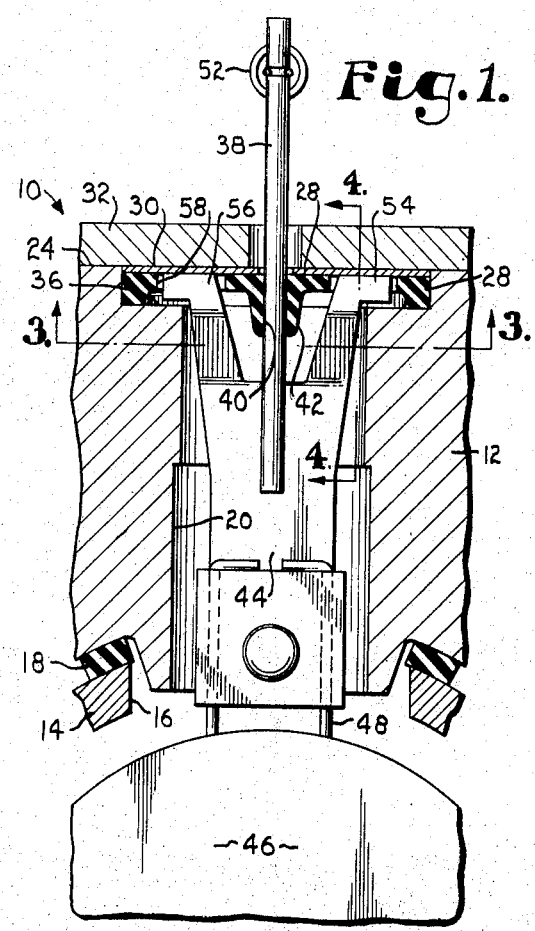
FIG. 1 is a fragmentary, transverse elevational, cross-sectional view of switch mechanism constructed in accordance with the principles of the invention and mounted to a fluid carrying conduit.

Referring now more particularly to the drawing, a flow detecting switch mechanism denoted by the numeral 10 generally includes a housing 12 which is secured by means (not shown) to a fluid carrying conduit 14 that may be of circular cross-section or other configuration. The housing overlies an aperture 16 in the conduit, and appropriate sealing means 18 hydraulically seals aperture 16. Housing 12 has an interior cavity 20 in open communication with the conduit and an opening 22 on a side 24 of the housing remote from and opposite to aperture 16.

The housing 12 has a counterbored area 26 at opening 22 which tightly receives a resilient member in the form of an elastomeric seal 28 and a rigid, circular metal backup element or disc 30 which is bonded to the upper side of seal 28 in overlying relationship thereto. A rigid plate 32, affixed to the remote side 24 of the housing, holds the seal and backup disc in the counterbored area and presses an upstanding peripheral ridge 34 into sealing contact with a recessed shoulder 36 on the housing defined by the counterbored area 26.

A rigid, metallic shaft 38 extends through a central aperture 40 in a thickened, circular central portion 42 of the seal, and through aligned openings in backup disc 30 and plate 32. Preferably, shaft 38 is bonded in tight fitting sealing relationship with the central portion 42 of the seal, and through aligned openings in backup disc 30 and plate 32. A generally thin, flat, rigid arm 44 disposed in cavity 20 is rigidly and permanently affixed to the shaft 38. Arm 44 is, in turn, connected to a flow detecting device in the form of a movable vane (or similar structure) 46 located inside conduit 14 generally transverse to the direction of fluid flow therein, by a torsional spring 48 that is rigidly connected to arm 44 and vane 46. Vane 46 shifts in response to the force of fluid flow therein and shaft 38 is induced to rock or pivot by virtue of the limited rigidity of torsional spring 48. Together, shaft 38 and vane 46 comprise the major components of a flow detecting means that shifts in response to fluid flow in the conduit to effect a slight pivoting motion of the outer portion of shaft 38.

Located externally relative to the remote side 24 of the housing is an electrical switch or like indicator 50 that is disposed adjacent the outer portion of the shaft to be engaged and actuated thereby. Biasing means in the form of spring 52 engages the shaft to urge it to a vertical position perpendicular to flow in the conduit and in nonengaging relationship with switch 50 to indicate absence of flow in the conduit. Switch 50 may be a mechanical indicator or an electrical switch connected in circuitry (not shown) for indicating flow or for controlling the operation of any related apparatus in response to flow conditions in the conduit. Typically, switch 50 may be incorporated into time delay, electrical controls.

Figure 2:
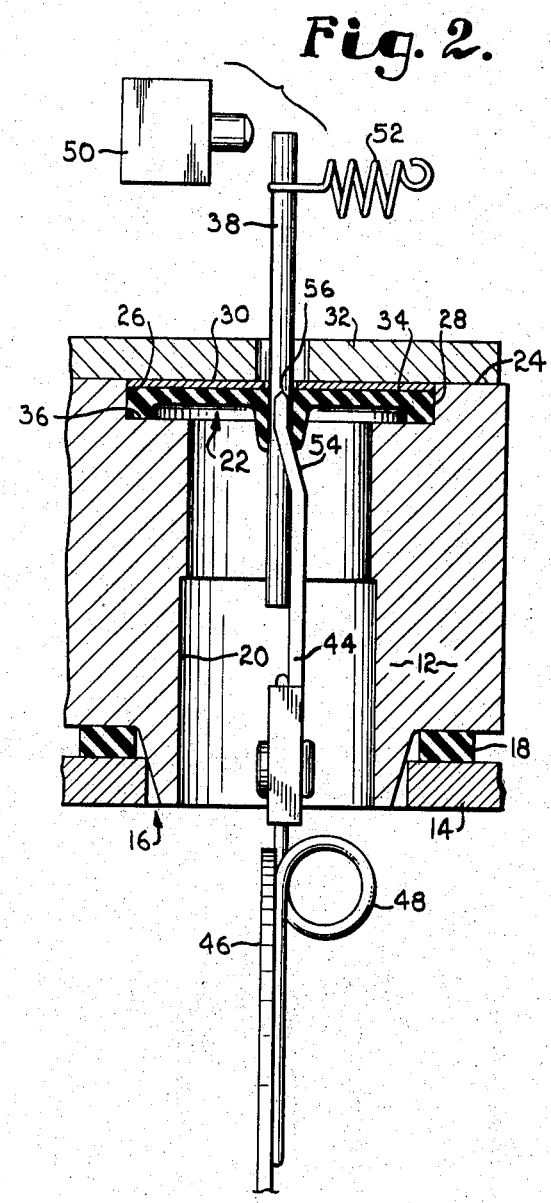
FIG. 2 is a fragmentary, longitudinal elevational, cross-sectional view of the switch mechanism of FIG. 1 and showing an external electrical switch in elevation.

Arm 44 includes a bifurcated structure indicated as projections 54 having upper knife edges 56 bevelled to a relatively sharp V-shape (see FIG. 2) and aligned generally transverse to the direction of fluid flow in the conduit. Knife edges 56 are received in corresponding elongated trough grooves 58 in seal 28 with the apexes thereof lying in line contact upon backup disc 30. The projecting portion 42 of the elastomer seal bonded to shaft 38 permits the shaft to articulate about a pivot point which coincides with the two knife-edges 56 on the bifurcated projections. Alternately, the knife edges may be formed by a single bevel at the upper edges of projections 54, and edges 56 may be formed with a very small radius to reduce theri tendency to cut and wear into disc 30, to reduce frictional contact with disc 30 and to increase the bearing capacity and quality of the contact between the disc and the knife edges. In any instance, the knife edges are configured to define an essentially friction-free pivotal axis for the rocking motion of shaft 38 induced by shifting of vane 46 in response to changes in fluid flow.

Figure 3:
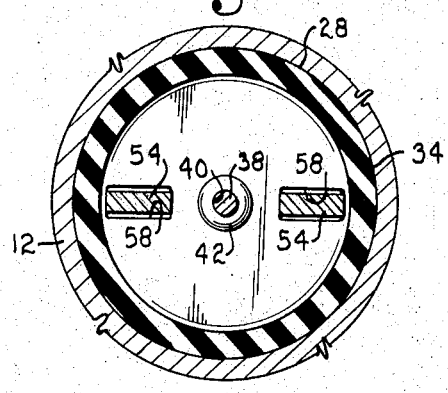
FIG. 3 is a bottom plan view of the sealing member and the projection of the arm taken along lines 3—3 of FIG. 1.
Figure 4:
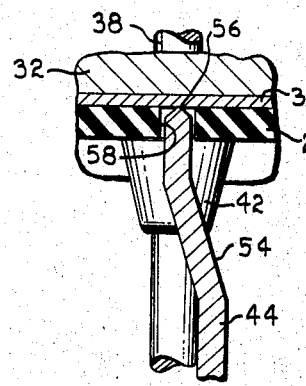
FIG. 4 is an enlarged cross-sectional view taken along lines 4—4 of FIG. 1.

Projections 54 are received rather snugly within grooves 58, except that grooves 58 are slightly wider than the arms to facilitate freedom of pivoting of the projections upon knife edges 56 to a limited degree sufficient to contact switch 50. Cooperation of seal 28 with the arm 44 prevents torsional twisting of shaft 38 and arm 44 in clockwise and counterclockwise directions (as viewed in FIG. 3) as well as constraining the shaft against linear axial shifting. At the same time, however, seal 28 effectively hydraulically seals against the housing 12, backup disc 30 and shaft 38 to prevent fluid leakage out of the conduit through housing cavity 20.

To further assist in constraining the shaft against disorienting movement, projections 54 extend transversely into counterbored area 26 and above shoulder 36, so that the housing surrounds same to an extent constraining the projections and shaft against dislodgement from the position illustrated.

In operation, switch mechanism 10 is assembled into conduit 14 in the position shown. The switch 50 and spring 52 are normally located within the interior of an upper chamber of housing 12 lying above remote side 24. Arm 44 is in hydrostatic balance within cavity 20. The only hydrostatic force exerted on knife edges 56 is that developed by pressure acting essentially on the diameter of shaft 38 and center seal portion 42. Accordingly, minimum friction producing forces are impressed on the pivot axis defined by knife edges 56. In contrast, prior art constructions which drive a pivot member embedded in the seal are subject to friction-producing forces created by pressure acting in the entire area of the sealing member as well as the area of the shaft.

As fluid flow develops in conduit 14 and acts against vane 46, the latter shifts longitudinally generally in the direction of fluid flow. The torsional spring 48 actually causes a slight rotational (instead of linear) motion of the vane, and causes pivoting of shaft 38 on the essentially friction-free axis defined by knife edges 56. Shaft 38 thereupon contacts and actuates switch 50 in response to presence of flow in conduit 14. The resiliency of spring 48, as well as cooperation of projections 54 with seal 28, limits the extent of pivoting of the shaft past that necessary to operate switch 50. When flow in the conduit lessens or stops completely, the urgings of biasing spring 52 will overcome the force exerted on vane 46 and return the shaft to its perpendicular position illustrated to thereby indicate absence of flow in the conduit.

Suspension of vane 46 by torsional spring 48 allows the vane to rotate up to a position generally parallel to the direction of flow. In such position the vane affords minimal resistance to high flow volumes or velocities. At the same time, the resiliency of spring 48 limits the extent of movement of shaft 38 to that necessary to operate the switch. In this manner wear on seal 28 is minimized, and effective sealing can still be accomplished by a sealing member of relatively simple, economical design.

Switch 10 is effective in detecting flows of fluids of different viscosity and substance in the conduit. Also, the switch may be utilized with conduits of varying sizes and shapes, and while it is desirable that the shape of the vane match the cross-sectional configuration of the conduit, such correspondence in shape is not necessary to the proper operation of the switch. Accordingly, it will be observed that the switch is highly versatile in use without detracting from the advantages of the novel features of the invention.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Mechanism for detecting flow in a fluid carrying conduit having an aperture therein, said mechanism comprising:

a housing adapted for securement to the conduit in overlying, sealing relationship to said aperture and having an opening in a side of the housing;

a switch disposed exteriorly of said side of the housing for indicating flow through the conduit when actuated;

flow detecting means adapted for insertion in the conduit and shiftable in response to fluid flow therethrough, said flow detecting means extending into said housing and including a shaft extending exteriorly of the housing through said opening therein with an outer portion of said shaft located in engaging relationship with said switch to actuate the latter;

a resilient member at said side of the housing closing said opening and sealingly engaging said shaft, said member having a pair of aligned, elongated grooves spaced apart on opposite sides of said shaft;

a rigid backup element secured to said housing and overlying said resilient member to hold the latter in sealing relationship in said opening against hydraulic pressure developed within said housing; and an arm located within the housing and secured to said shaft, said arm including a pair of projections disposed on opposite sides of said shaft and spaced therefrom, said projections having knife edges movably received within said grooves and in a close fitting relationship therewith resulting in corresponding low friction pivotal movement of said arm relative to said backup element, said projections further cooperating with said resilient member to allow limited pivotal movement of said shaft about said knife edges to actuate said switch while resisting movement of said shaft other than said pivotal movement thereof upon shifting of said flow detecting means in response to flow in the conduit.

2. The combination as in claim 1 including biasing means engaging said outer portion of the shaft for urging the latter to a position extending generally perpendicular to said direction of flow in the conduit and in non-engaging relationship with said switch in the absence of flow in the conduit.

3. The combination as in claim 1 wherein each of said knife edges is of a generally V-shaped configuration with the apex thereof lying in line contact with said backup element.

4. The combination as in claim 1 wherein said flow detecting means includes a vane adapted to be disposed generally transversely across the conduit, and a torsional spring operably connecting said vane with said shaft to allow said vane to shift substantially parallel to the direction of flow while limiting said pivotal movement of the shaft under conditions of high flow velocities in the conduit.

5. The combination as in claim 4 wherein said torsional spring is connected to said vane and said arm.

6. The combination as in claim 1 wherein said resilient member is an elastomeric seal having a central aperture therein, said shaft extending in bonded, sealing relationship through said aperture whereby cooperation of said seal with said shaft assists in preventing movement of said shaft other than said pivotal movement thereof.

7. The combination as in claim 1 wherein said housing has a counterbored area on said remote side thereof defining a recessed shoulder surrounding said opening, said resilient member being disposed in said counterbored area and resting on said shoulder.

8. The combination as in claim 9 wherein said backup member is a circular metal disc bonded to and overlying said resilient member and disposed within said counterbored area, said mechanism further comprising a rigid plate secured to said housing and overlying said disc to hold said disc and resilient member in said counterbored area.

9. The combination as in claim 7, wherein each of said projections and said knife edges extends generally transversely of said shaft into said counterbored area whereby said housing surrounds said projections to an extent constraining the latter from dislodgement from said grooves.

10. The combination as in claim 1 wherein said resilient member is an elastomeric seal having a normal flexure point, said knife edges being generally aligned with said seal flexure point.

11. The combination as in claim 10, wherein said flexure point is located interiorly of said housing.

* * * * *